United States Patent
Li et al.

(10) Patent No.: US 11,734,277 B2
(45) Date of Patent: Aug. 22, 2023

(54) DATABASE BUFFER POOL OPTIMIZATION

(71) Applicant: INTERNATIONAL BUSINESS MACHINES CORPORATION, Armonk, NY (US)

(72) Inventors: Shuo Li, Beijing (CN); Xiaobo Wang, Beijing (CN); Hong Mei Zhang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/248,757

(22) Filed: Feb. 5, 2021

(65) Prior Publication Data

US 2022/0253444 A1    Aug. 11, 2022

(51) Int. Cl.
*G06F 16/2455* (2019.01)
*G06F 12/0882* (2016.01)
*G06F 16/25* (2019.01)

(52) U.S. Cl.
CPC .... *G06F 16/24552* (2019.01); *G06F 12/0882* (2013.01); *G06F 16/25* (2019.01)

(58) Field of Classification Search
None
See application file for complete search history.

(56) References Cited

U.S. PATENT DOCUMENTS

| | | | |
|---|---|---|---|
| 7,689,607 B2 | 3/2010 | Oks | |
| 9,069,484 B2 | 6/2015 | Zhang | |
| 9,336,258 B2 | 5/2016 | Bhattacharjee | |
| 9,928,264 B2 | 3/2018 | Lomet | |
| 2005/0267891 A1 | 12/2005 | Shimizu | |
| 2011/0219169 A1* | 9/2011 | Zhang | G06F 3/061 711/159 |

(Continued)

FOREIGN PATENT DOCUMENTS

KR    101863206 B1    5/2018

OTHER PUBLICATIONS

Kodandaramaih, Raghavendra Thallam et al.; Concurrent Updates to Pages with Fixed-Size Rows Using Lock-Free Algorithms; Proceedings of the Very Large Databases Endowment, vol. 13, No. 12; Sep. 3, 2020; 9 pages.

*Primary Examiner* — Polina G Peach
*Assistant Examiner* — Anugeetha Kunjithapatham
(74) *Attorney, Agent, or Firm* — Schmeiser, Olsen & Watts, LLP; Stephanie Carusillo (57) ABSTRACT

An approach is provided for optimizing a database buffer pool. Based on statistics about read and write operations in a range of pages, the range of pages is determined to be a candidate for a hot read range for which locks and latches are avoided in processing operations in the hot read range. Using an on-time trigger or pre-trigger process, the hot read range is created from the range of pages by marking start and end points in the range of pages. Write operation(s) are determined to be included in the hot read range by marking an object control block. The write operation(s) are added to a write pending list. The read operations in the hot read range are performed without a latch or lock. The write operation(s) are merged from the write pending list to the range of pages and the write operation(s) are performed.

18 Claims, 9 Drawing Sheets

(56) References Cited

U.S. PATENT DOCUMENTS

| | | | |
|---|---|---|---|
| 2013/0024609 A1* | 1/2013 | Gorobets | G06F 3/0611 |
| | | | 711/E12.008 |
| 2014/0032851 A1 | 1/2014 | Lightstone | |
| 2014/0279840 A1* | 9/2014 | Chan | G06F 16/22 |
| | | | 707/607 |
| 2015/0186051 A1* | 7/2015 | Gurajada | G06F 3/0689 |
| | | | 711/113 |
| 2016/0275171 A1* | 9/2016 | Barber | G06F 16/2465 |
| 2017/0371912 A1* | 12/2017 | Kimura | G06F 16/2365 |
| 2018/0253468 A1* | 9/2018 | Gurajada | G06F 16/2255 |
| 2021/0263779 A1* | 8/2021 | Haghighat | G06F 9/5061 |

\* cited by examiner

DATABASE BUFFER POOL OPTIMIZATION

BACKGROUND

The present invention relates to storage management for a database management system, and more particularly to controlling buffer pool performance.

Latches and locks are used to control access to shared database information. A latch is a serialization mechanism used to guarantee physical consistency of shared data structures or resources (e.g., pages in a buffer pool). Page latching is an efficient way to ensure physical consistency of a page, while page locks ensure that data is committed. Page latches consist of S-latches (i.e., shared latches) and X-latches (exclusive latches). Using an S-latch avoids a need to obtain Internal Resource Lock Manager (IRLM) locks. Current shared information access techniques request S-latches in order to read pages. Using an X-latch serializes access with S-latches and other X-latches for an update process. Current shared information access techniques request X-latches in order to write pages.

SUMMARY

In one embodiment, the present invention provides a computer-implemented method. The method includes based on statistics about read operations and write operations in a range of pages, determining, by one or more processors, that the range of pages is a candidate for being a hot read range for which page locks and page latches are avoided in processing operations in the hot read range. The method further includes creating, by the one or more processors and using an on-time trigger process or a pre-trigger process, the hot read range from the range of pages by marking a start point of the hot read range in the range of pages and an end point of the hot read range in the range of pages. The method further includes determining, by the one or more processors, that one or more write operations are included in the hot read range by marking an object control block. The method further includes based on the one or more write operations being included in the hot read range, adding, by the one or more processors, the one or more write operations to a write pending list. The method further includes performing, by the one or more processors, the read operations in the hot read range without using a latch or a lock for any page in the hot read page. The method further includes in response to the performing the read operations, merging, by the one or more processors, the one or more write operations from the write pending list to the range of the pages and performing the one or more write operations.

A computer program product and a computer system corresponding to the above-summarized method are also described and claimed herein.

DETAILED DESCRIPTION

Overview

Some database query workloads have most of their operations being read operations with very few write operations. For each read and write operation, a latch and a lock are requested to guarantee consistency for the data. Requesting latches and locks can hinder database performance.

Embodiments of the present invention address the aforementioned unique challenges of the traditional approaches to controlling access to shared information by improving buffer pool information in cases in which read operations significantly outnumber write operations, thereby accelerating buffer pool performance. In one embodiment, a buffer pool optimization system determines that a page is likely not to be changed by any write operations and therefore does not request a latch for the page during a read period (i.e., a period of time in which read operations are performed on the page). Further, the buffer pool optimization system applies any update or insert requirements in a period for handling pending write operations via a buffer pool. A buffer pool manager guarantees that the page is not updated during the read period. The buffer pool optimization system provides improved database performance and prevents data integrity issues.

In one embodiment, a buffer pool optimization system (1) finds candidate ranges of pages for lock and latch avoidance; (2) creates an action list that designates a range as a hot read range, marks start and end points of the hot read range, indicates a status of the hot read range, and maintains statistics about the hot read range; (3) marks up an object control block to determine whether write operations are within the hot read range; (4) performs the read operations in the hot read range while avoiding a usage of a read lock or a read latch and adds the write operations to a write pending list; (5) after the read operations are completed, merges write operations from the write pending list to the range of pages; and (6) processes new read operations after the write operations are performed.

System for Optimizing a Database Buffer Pool

Figure 1:
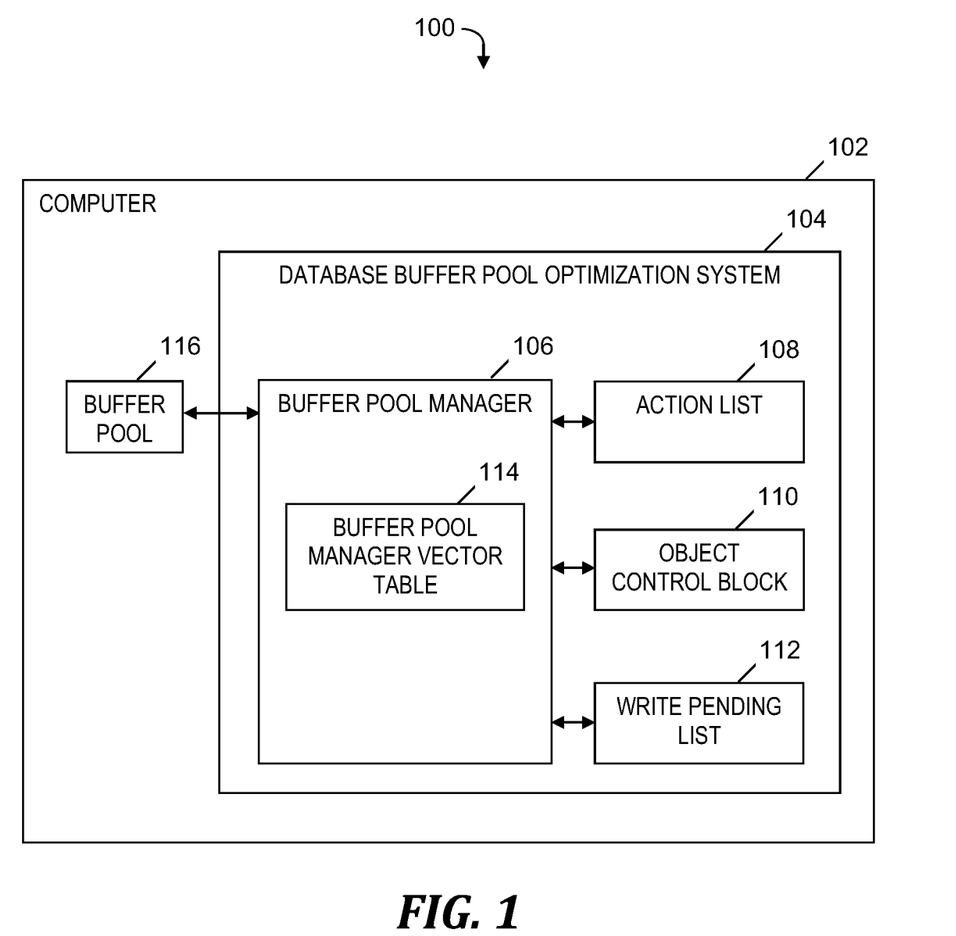
FIG. 1 is a block diagram of a system for optimizing a database buffer pool, in accordance with embodiments of the present invention.

FIG. 1 is a block diagram of a system 100 for optimizing a database buffer pool, in accordance with embodiments of the present invention. System 100 includes a computer 102 that includes a software-based database buffer pool optimization system 104, which includes a buffer pool manager 106, an action list 108, an object control block 110, and a write pending list 112. Buffer pool manager 106 includes a buffer pool manager vector table 114. Buffer pool manager 106 manages a buffer pool 116.

Database buffer pool optimization system 104 identifies ranges of pages that are a candidates to be hot read ranges. In one embodiment, a given range of pages is a candidate for being a hot read range based on statistics about the number or read operations and the number of write operations in the given range of pages. Database buffer pool optimization system 104 creates action list 108 that designates a given range of pages as a hot read range by marking the start and end points of the range of pages, storing an indicator of a status of the range of pages, and storing statistics about the range of pages.

Database buffer pool optimization system 104 marks the object control block 110 to indicate whether a new write operation is within a given range of pages designated in the action list 108 as a hot read range. If the new write operation is within the given range of pages designated as a hot read range, then database buffer pool optimization system 104 adds the new write operation to write pending list 112.

Buffer pool manager vector table 114 stores (i) database objects associated with the candidate ranges of pages, (ii) entries in the ranges of pages designated as hot read ranges, and (iii) information about the hot read ranges (i.e., range start point, range end point, range status, and range statistics, including the number of read and write operations).

Buffer pool manager 106 can read from buffer pool 116 using, for example, sequential reference, block reference, random with hot blocks reference, and other scenarios with hot blocks.

The functionality of the components shown in FIG. 1 is described in more detail in the discussion of FIG. 2, FIG. 3, FIG. 4, FIG. 5, FIG. 6, FIG. 7, FIG. 8, and FIG. 9 presented below.

Process for Optimizing a Database Buffer Pool

Figure 2:
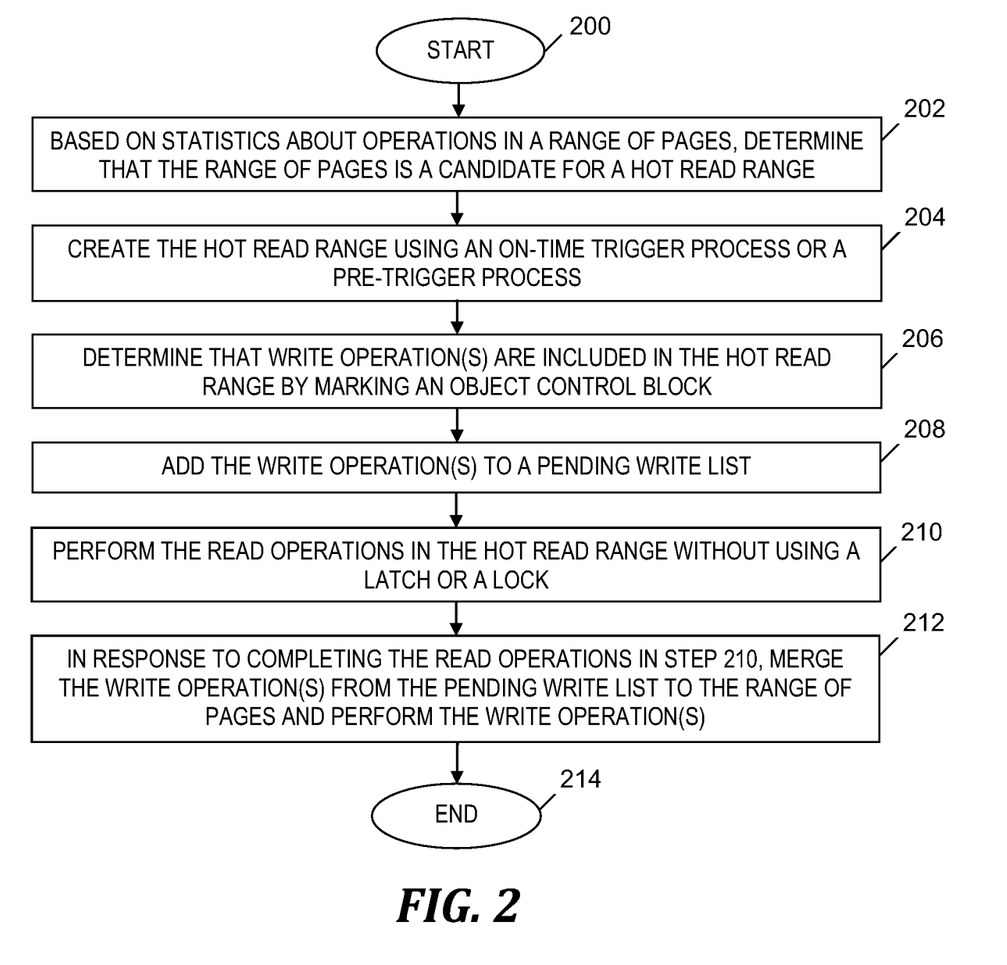
FIG. 2 is a flowchart of a process of optimizing a database buffer pool, where the process is implemented in the system of FIG. 1, in accordance with embodiments of the present invention.

FIG. 2 is a flowchart of a process of optimizing a database buffer pool, where the process is implemented in the system of FIG. 1, in accordance with embodiments of the present invention. The process of FIG. 2 begins at a start node 200. Prior to step 202, database buffer pool optimization system 104 (see FIG. 1) receives or determines statistics that include counts of the number of read operations and the number of write operations in ranges of pages. In step 202, based on the aforementioned statistics, database buffer pool optimization system 104 (see FIG. 1) determines that a range of pages is a candidate for being designated as a hot read range. As used herein, a hot read range is defined as a range of pages for which database buffer pool optimization system 104 (see FIG. 1) guarantees that the pages in the range will not be changed and will not require a request of a page latch or page lock.

In one embodiment, using the aforementioned statistics, database buffer pool optimization system 104 (see FIG. 1) determines a ratio of the number of read operations to the number of write operations in a range of pages and determines that the ratio exceeds a defined threshold amount, where database buffer pool optimization system 104 (see FIG. 1) receives the threshold amount prior to step 202. In step 202, in response to the determination that the ratio exceeds the defined threshold amount, database buffer pool optimization system 104 (see FIG. 1) determines that the range of pages is a candidate for being designated as a hot read range.

In step 204, database buffer pool optimization system 104 (see FIG. 1) creates the hot read range for the candidate range of pages by marking action list 108 (see FIG. 1) with the start and end points of the range of pages, storing an indicator of the status of the range of pages, and storing statistics about the range of pages. The creation of the hot read range in step 204 includes using an on-time trigger process or a pre-trigger process. The on-time trigger process is described below in the discussion of FIG. 3. The pre-trigger process is described below in the discussion of FIG. 4.

In one embodiment, a directory of hot read ranges searches each page in a given range of pages and database buffer pool optimization system 104 (see FIG. 1) performs the following: (1) acquires storage pools and builds buffer pool manager vector table (BMVT) 114 (see FIG. 1); (2) stores the address of the BMVT 114 (see FIG. 1) into a communication area of database buffer pool optimization system 104 (see FIG. 1); (3) establishes a write log cursor; (4) marks the given range of pages as being read-only; (5) builds up the write pending list 112 (see FIG. 1) as a buffer; (6) builds up a statistics structure that stores the range start and end points, the range status, and other statistics including the number of read and write operations in the range; and (7) periodically checks the statistics in the statistics structure to create a hot read range (i.e., designate the given range of pages as being a hot read range).

In step 206, database buffer pool optimization system 104 (see FIG. 1) marks objection control block 110 (see FIG. 1) to indicate that write operation(s) newly received by database buffer pool optimization system 104 (see FIG. 1) are within the hot read range created in step 204.

In step 208, in response to the write operation(s) being within the hot read range as indicated by the marking of the object control block 110 (see FIG. 1) in step 206, database buffer pool optimization system 104 (see FIG. 1) adds the write operation(s) to write pending list 112 (see FIG. 1).

In step 210, database buffer pool optimization system 104 (see FIG. 1) performs that read operations in the hot read range without using a latch or a lock for any page in the hot read range.

In step 212, in response to completing the performance of the read operations in the hot read range in step 210, database buffer pool optimization system 104 (see FIG. 1) merges the write operation(s) from write pending list 112 (see FIG. 1) to the range of pages and performs the write operation(s).

Following step 212, the process of FIG. 2 finishes at an end node 214.

In one embodiment, after the range of pages is designated as a hot read range, database buffer pool optimization system 104 (see FIG. 1) (i) determines that write pending list 112 (see FIG. 1) is not empty (i.e., includes at least one write operation); (ii) determines that new read operation(s) are arriving for processing; (iii) based on the new read operation(s) arriving and the write pending list 112 (see FIG. 1) being not empty, determines that a conflict exists between the new read operation(s) and the at least one write operation in the write pending list 112 (see FIG. 1); and (iv) in response to the determination that the conflict exists, performs the at least one write operation prior to performing the new read operation(s). Alternatively, if step (iii) in this paragraph determines that no conflict exists, then database buffer pool optimization system 104 (see FIG. 1) performs the new read operation(s) directly, without waiting for other operations to be processed.

In one embodiment, database buffer pool optimization system 104 (see FIG. 1) avoids performance regression by performing the following steps to handle the write operations in write pending list 112 (see FIG. 1): (i) determine that a first set of write operations in the write pending list 112 (see FIG. 1) had been included on a first page; (ii) based on the first set of write operations having been included on the first page, move the first set of write operations from the write pending list 112 (see FIG. 1) to a single page in buffer pool 116 (see FIG. 1) (e.g., using an elevator algorithm) or to a contiguous group of pages in buffer pool 116 (see FIG. 1); and (iii) process the first set of write operations included in the single page in the buffer pool 116 (see FIG. 1) or in the contiguous group of pages in the buffer pool 116 (see FIG. 1).

Creating a Hot Read Range

Figure 3:
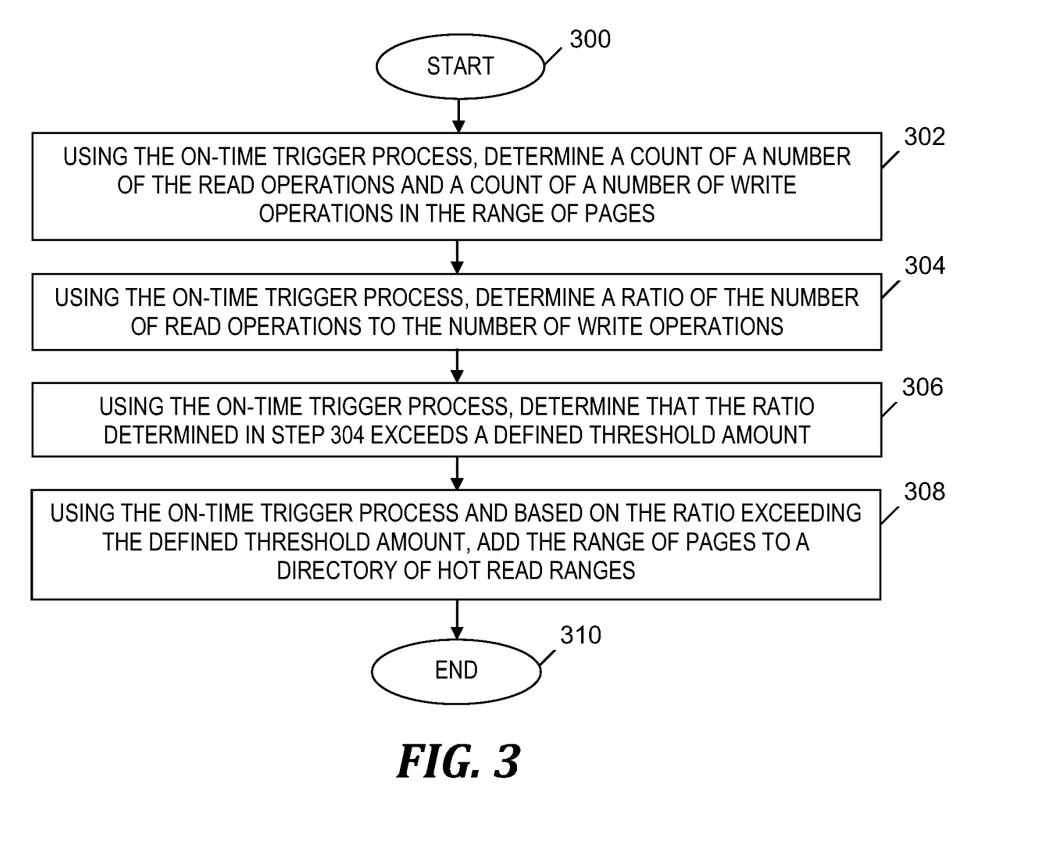
FIG. 3 is a flowchart of a process of using an on-time trigger technique in creating a hot read range within the process of FIG. 2, in accordance with embodiments of the present invention.

FIG. 3 is a flowchart of a process of using an on-time trigger technique in creating a hot read range within the process of FIG. 2, in accordance with embodiments of the present invention. In one embodiment, the process of FIG. 3 is included in step 204 (see FIG. 2). The steps in the process of FIG. 3 are included in an on-time trigger technique (also referred to herein as "on-time trigger process") for creating a hot read range.

The process of FIG. 3 starts at a start node 300. In step 302, database buffer pool optimization system 104 (see FIG. 1) determines a count of a number of the read operations and a count of the number of write operations in a given range of pages.

In step 304, database buffer pool optimization system 104 (see FIG. 1) determines a ratio of the number of read operations to the number of write operations in the given range of pages.

In step 306, database buffer pool optimization system 104 (see FIG. 1) determines that the ratio determined in step 304 exceeds a defined threshold amount. Database buffer pool optimization system 104 (see FIG. 1) receives the defined threshold amount prior to step 304.

In step 308, based on the ratio exceeding the defined threshold amount, database buffer pool optimization system 104 (see FIG. 1) adds the given range of pages to a directory of hot read ranges, thereby designating the range of pages as being a hot read range.

Following step 308, the process of FIG. 3 ends at an end node 310.

Figure 4:
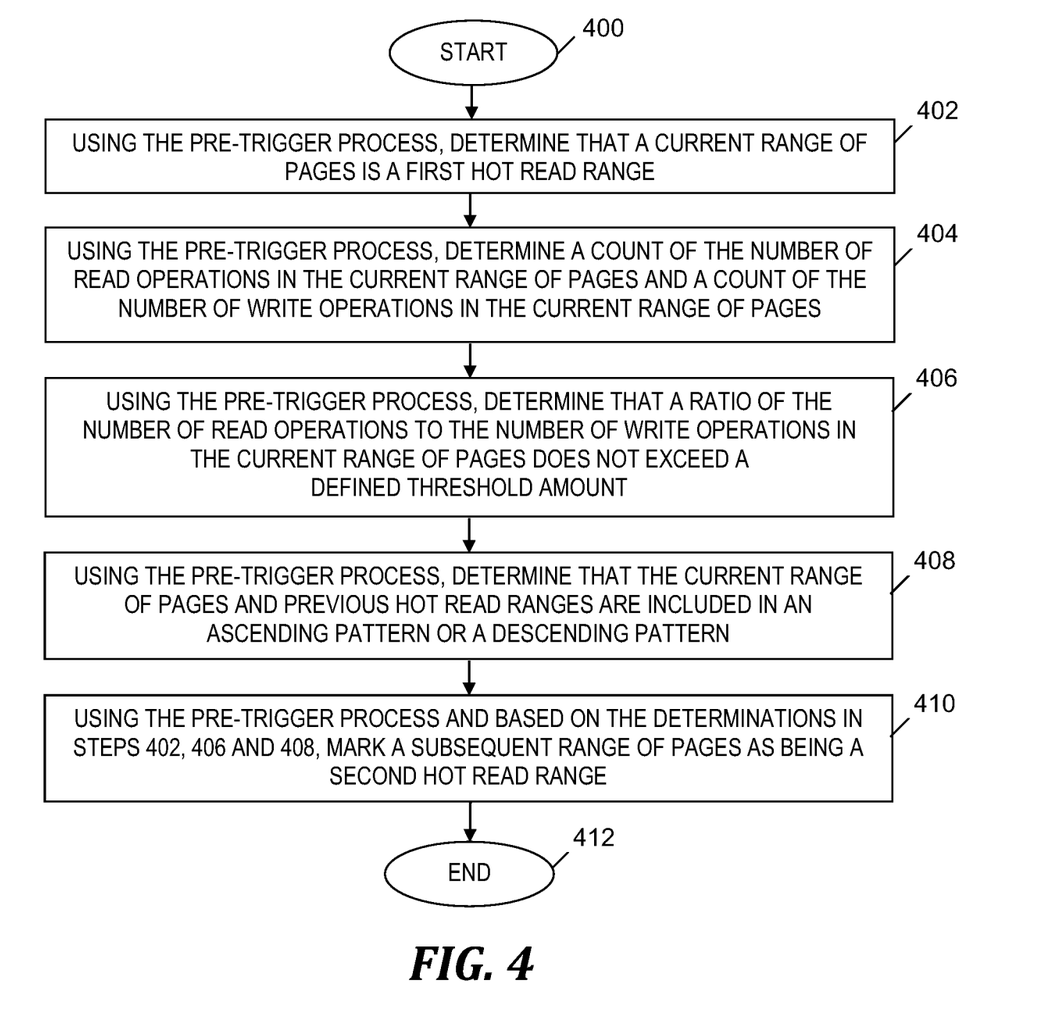
FIG. 4 is a flowchart of a process of using a pre-trigger technique in creating a hot read range within the process of FIG. 2, in accordance with embodiments of the present invention.

FIG. 4 is a flowchart of a process of using a pre-trigger technique in creating a hot read range within the process of FIG. 2, in accordance with embodiments of the present invention. In one embodiment, the process of FIG. 4 is included in step 204 (see FIG. 2). The steps in the process of FIG. 4 are included in a pre-trigger technique (also referred to herein as "pre-trigger process") for creating a hot read range.

The process of FIG. 4 starts at a start node 400. In step 402, database buffer pool optimization system 104 (see FIG. 1) determines that a current range of pages is a first hot read range.

In step 404, database buffer pool optimization system 104 (see FIG. 1) determines a count of a number of the read operations in the current range of pages and a count of the number of write operations in the current range of pages.

Prior to step 406, database buffer pool optimization system 104 (see FIG. 1) determines a ratio of the number of read operations to the number of write operations in the current range of pages. In step 406, database buffer pool optimization system 104 (see FIG. 1) determines that the ratio of the number of read operations to the number of write operations in the current range of pages does not exceed a defined threshold amount. Database buffer pool optimization system 104 (see FIG. 1) receives the defined threshold amount prior to step 406.

In step 408, database buffer pool optimization system 104 (see FIG. 1) determines that the current range of pages and previous hot read ranges are included in an ascending pattern or a descending pattern. In one embodiment, an ascending pattern is indicated by a series of period block reads in which a given block is shifted forward relative to the block immediately preceding the given block. In one embodiment, a descending pattern is indicated by a series of period block reads where a given block is shifted forward relative to the block immediately preceding the given block.

In step 410, based on the determinations made in steps 402, 406, and 408, database buffer pool optimization system 104 (see FIG. 1) marks a subsequent range of pages as being a second hot read range.

Following step 410, the process of FIG. 4 ends at an end node 412.

Removing a Hot Read Range

Figure 5:
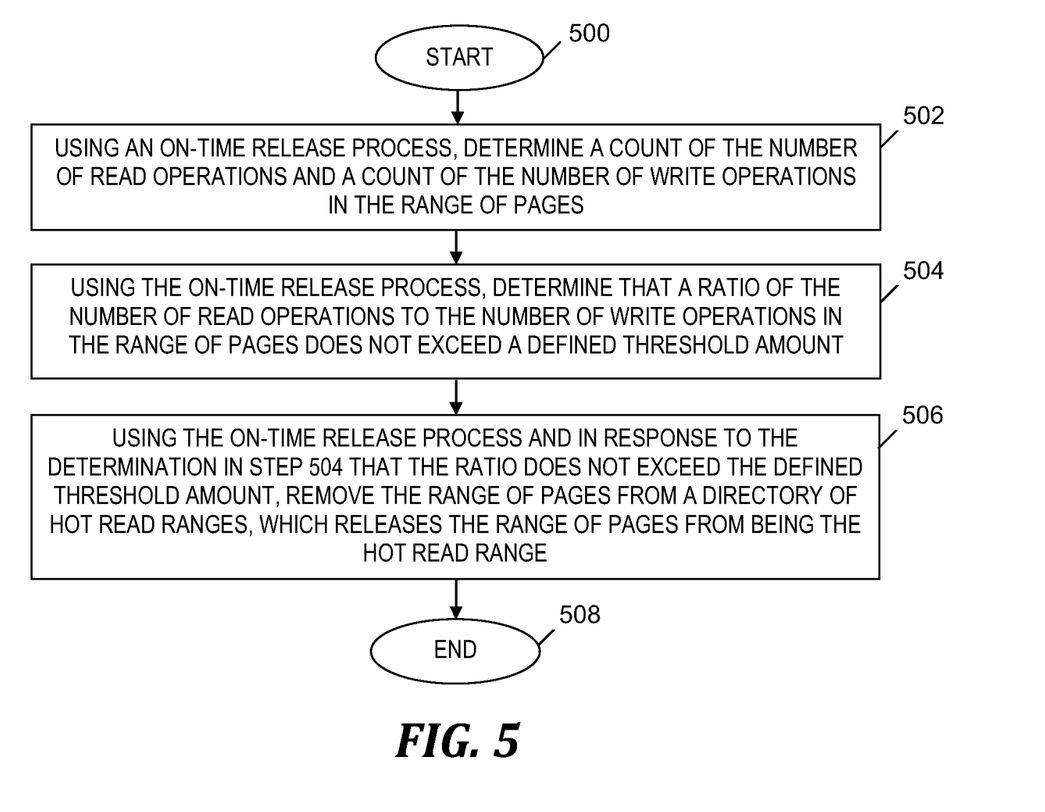
FIG. 5 is a flowchart of a process of using an on-time release technique in removing a hot read range that was previously created within the process of FIG. 2, in accordance with embodiments of the present invention.

FIG. 5 is a flowchart of a process of using an on-time release technique in removing a hot read range that was previously created within the process of FIG. 2, in accordance with embodiments of the present invention. In one embodiment, the process of FIG. 5 is added to the process of FIG. 2 after step 204 (see FIG. 2). The steps in the process of FIG. 5 are included in an on-time release technique (also referred to herein as "on-time release process") for removing a hot read range.

The method of FIG. 5 begins at a start node 500. In step 502, database buffer pool optimization system 104 (see FIG. 1) determines a count of a number of the read operations and a count of the number of write operations in a given range of pages.

Prior to step 504, database buffer pool optimization system 104 (see FIG. 1) calculates a ratio of the number of read operations to the number of write operations in the given range of pages.

In step 504, database buffer pool optimization system 104 (see FIG. 1) determines that the ratio of the number of read operations to the number of write operations in the given range of pages does not exceed a defined threshold amount. Database buffer pool optimization system 104 (see FIG. 1) receives the defined threshold amount prior to step 504.

In step 506, in response to the determination in step 504 that the ratio does not exceed the defined threshold amount, database buffer pool optimization system 104 (see FIG. 1) removes the given range of pages from a directory of hot read ranges, thereby releasing the given range of pages from being a hot read range.

Following step 506, the process of FIG. 5 ends at an end node 508.

Figure 6:
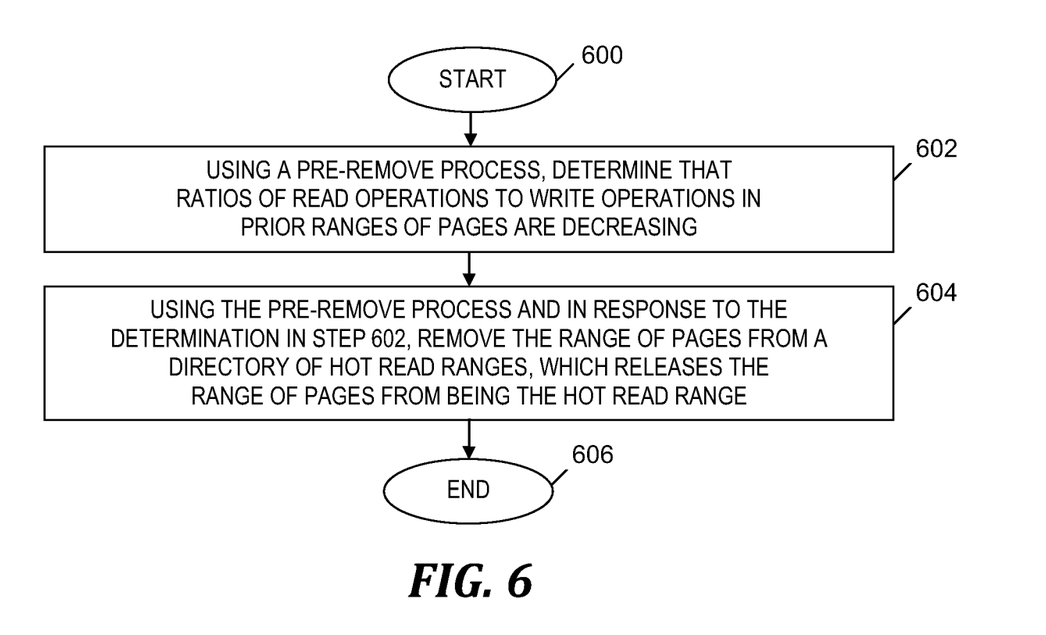
FIG. 6 is a flowchart of a process of using a pre-remove technique in removing a hot read range that was previously created within the process of FIG. 2, in accordance with embodiments of the present invention.

FIG. 6 is a flowchart of a process of using a pre-remove technique in removing a hot read range that was previously created within the process of FIG. 2, in accordance with embodiments of the present invention. In one embodiment, the process of FIG. 6 is added to the process of FIG. 2 after step 204 (see FIG. 2). The steps in the process of FIG. 6 are included in a pre-remove technique (also referred to herein as "pre-remove process") for removing a hot read range.

The process of FIG. 6 starts at a start node 600. In step 602, database buffer pool optimization system 104 (see FIG. 1) determines that ratios of the number of read operations to the number write operations in prior ranges of pages (i.e., prior to a given range of pages) are decreasing over time.

In step 604, in response to the determination in step 602 that the ratios are decreasing, database buffer pool optimization system 104 (see FIG. 1) removes the given range of pages from a directory of hot read ranges, which releases the given range of pages from being a hot read range. The removal is performed in advance of performing the write operations in the given range of pages, thereby maintaining efficiency in performing the write operations.

Following step 604, the process of FIG. 6 ends at an end node 606.

Alternately, the process of FIG. 6 includes database buffer pool optimization system 104 (see FIG. 1) detecting a tendency for prior ranges of pages to maintain a particular pattern of ratios of read to write operations that are below a threshold amount, determining that the pattern will likely be maintained by the current hot read range, and removing the current hot read range (i.e., releasing the current range of pages from being designated as the current hot read range) in advance of performing the write operations in the current range of pages.

Mirror Page Generation

In one embodiment, database buffer pool optimization system 104 (see FIG. 1) generates a mirror page to improve write efficiency by performing the following steps:

(i) add old read operations to old pages in buffer pool 116 (see FIG. 1);

(ii) add a write operation to a first page in buffer pool 116 (see FIG. 1), where the write operation had been in write pending list 112 (see FIG. 1) and the first page is subsequent to the old pages in buffer pool 116 (see FIG. 1);

(iii) using the old read operations in the old pages and using the first page in the buffer pool 116 (see FIG. 1), read first data from a database;

(iv) in response to the reading in step (iii), place the first page in a free page list;

(v) apply the write operation in the first page to write second data to the database;

(vi) in response to applying the write operation in step (v), create a mirror page in the buffer pool 116 (see FIG. 1), where the mirror page is a copy of the first page;

(vii) in response to applying the write operation in step (v), add new read operations to new pages in the buffer pool 116 (see FIG. 1), where the new pages are subsequent to the first page; and (viii) using the new read operations in the new pages and using the mirror page in the buffer pool 116 (see FIG. 1), read third data in the database.

Examples

Figure 7:
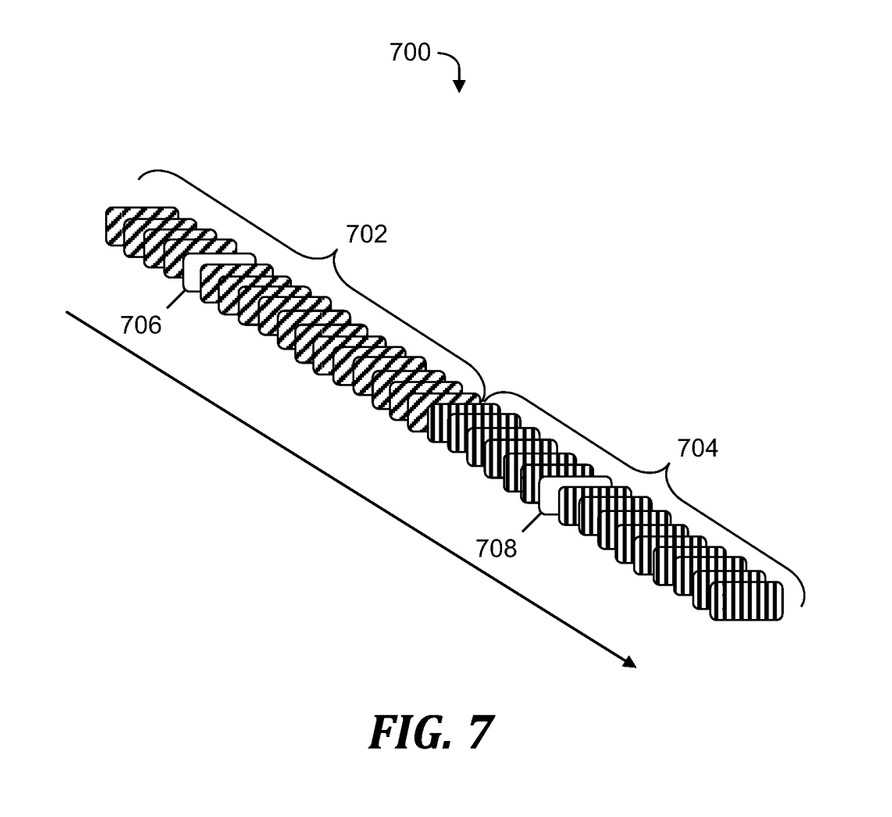
FIG. 7 is an example of creating a hot read range using the process in FIG. 3 or FIG. 4, in accordance with embodiments of the present invention.

FIG. 7 is an example 700 of creating a hot read range using the process in FIG. 3 or FIG. 4, in accordance with embodiments of the present invention. Example 700 includes a first block 702 of pages and a second block 704 of pages. The arrow extending the length of blocks 702 and 704 indicates the order in which the pages are processed. In block 702, a page 706 includes a write operation and the other pages (i.e., the pages that have the diagonal line pattern) in block 702 include read operations and no write operations. In step 306 (see FIG. 3), database buffer pool optimization system 104 (see FIG. 1) determines that the ratio of the number of read operations in block 702 to the number of write operations in block 702 exceeds the defined threshold amount. Thus, in step 308 (see FIG. 3), database buffer pool optimization system 104 (see FIG. 1) adds the range of pages in block 702 to the directory of hot read ranges (i.e., creating a hot read range by designating the range of pages in block 702 as a hot read range).

In block 704, a page 708 includes a write operation and the other pages (i.e., the pages that have the vertical line pattern) in block 704 include read operations and no write operations. In step 306 (see FIG. 3), database buffer pool optimization system 104 (see FIG. 1) determines that the ratio of the number of read operations in block 704 to the number of write operations in block 704 exceeds the defined threshold amount. Thus, in step 308 (see FIG. 3), database buffer pool optimization system 104 (see FIG. 1) adds the range of pages in block 704 to the directory of hot read ranges (i.e., creating a hot read range by designating the range of pages in block 704 as a hot read range).

Alternately, database buffer pool optimization system 104 (see FIG. 1) makes the determinations in steps 402, 406, and 408 (see FIG. 4), and based on those determinations, in step 410 (see FIG. 4), database buffer pool optimization system 104 (see FIG. 1) marks the range of pages in block 704 as being a hot read range.

Figure 8:
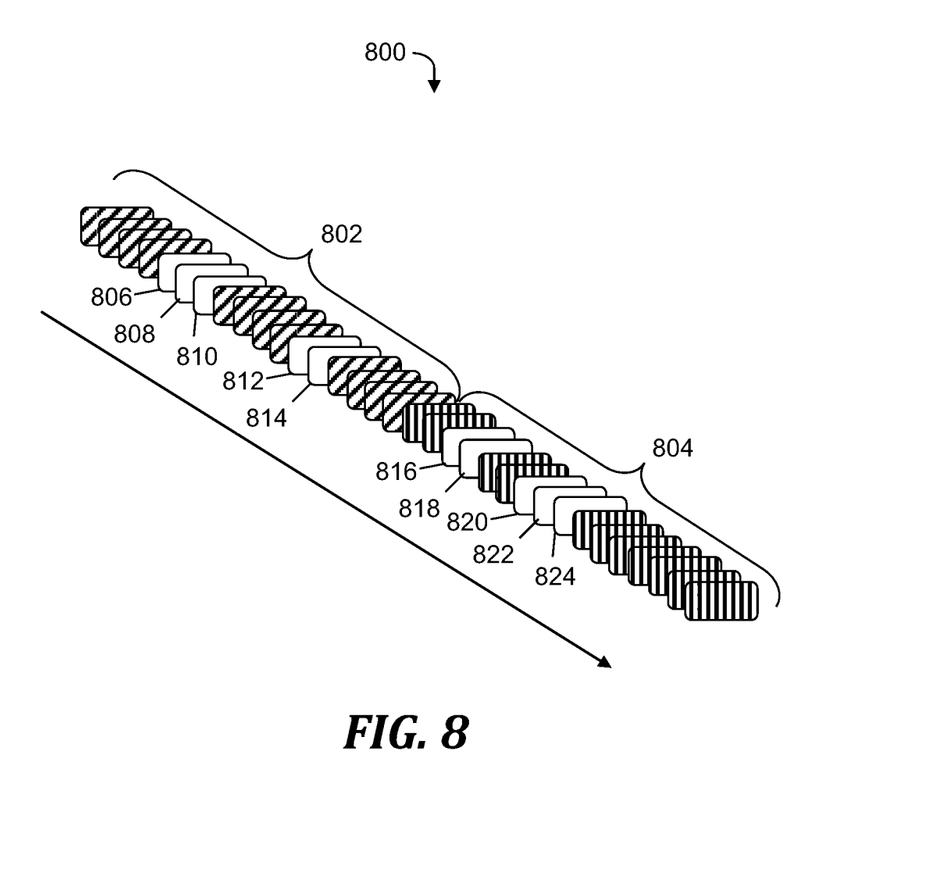
FIG. 8 is an example of removing a hot read range using the process in FIG. 5 or FIG. 6, in accordance with embodiments of the present invention.

FIG. 8 is an example of removing a hot read range using the process in FIG. 5 or FIG. 6, in accordance with embodiments of the present invention. Example 800 includes a first block 802 of pages and a second block 804 of pages. The arrow extending the length of blocks 802 and 804 indicates the order in which the pages are processed. In block 802, each of pages 806, 808, 810, 812, and 814 includes a write operation and the other pages (i.e., the pages that have the diagonal line pattern) in block 802 include read operations and no write operations. In step 502 (see FIG. 5), database buffer pool optimization system 104 (see FIG. 1) determines a count of the number of read operations and a count of the number of write operations in the range of pages in block 802. In step 504 (see FIG. 5), database buffer pool optimization system 104 (see FIG. 1) determines that a ratio of the number of read operations to the number of write operations in the range of pages in block 802 does not exceed a defined threshold amount. In step 506 (see FIG. 5), in response to the determination in step 504, database buffer pool optimization system 104 (see FIG. 1) removes the range of pages in block 802 from a directory of hot read ranges, which releases the range of pages from being designated as a hot read range.

In block 804, each of pages 816, 818, 820, 822, and 824 includes a write operation and the other pages (i.e., the pages that have the vertical line pattern) in block 804 include read operations and no write operations. In step 502 (see FIG. 5), database buffer pool optimization system 104 (see FIG. 1) determines a count of the number of read operations and a count of the number of write operations in the range of pages in block 804. In step 504 (see FIG. 5), database buffer pool optimization system 104 (see FIG. 1) determines that a ratio of the number of read operations to the number of write operations in the range of pages in block 804 does not exceed the defined threshold amount. In step 506 (see FIG. 5), in response to the determination in step 504, database buffer pool optimization system 104 (see FIG. 1) removes the range of pages in block 804 from the directory of hot read ranges, which releases the range of pages from being designated as a hot read range.

Alternately, in step 602 (see FIG. 6), database buffer pool optimization system 104 (see FIG. 1) determines that ratios of read operations to write operations in ranges of pages (including the range of pages in block 802) that precede the range of pages in block 804 are decreasing. In step 604 (see FIG. 6), in response to the determination in step 602, database buffer pool optimization system 104 (see FIG. 1) removes the range of pages in block 804 from the directory of hot read ranges, which releases the range of pages in block 804 from being designated as a hot read range.

Computer System

Figure 9:
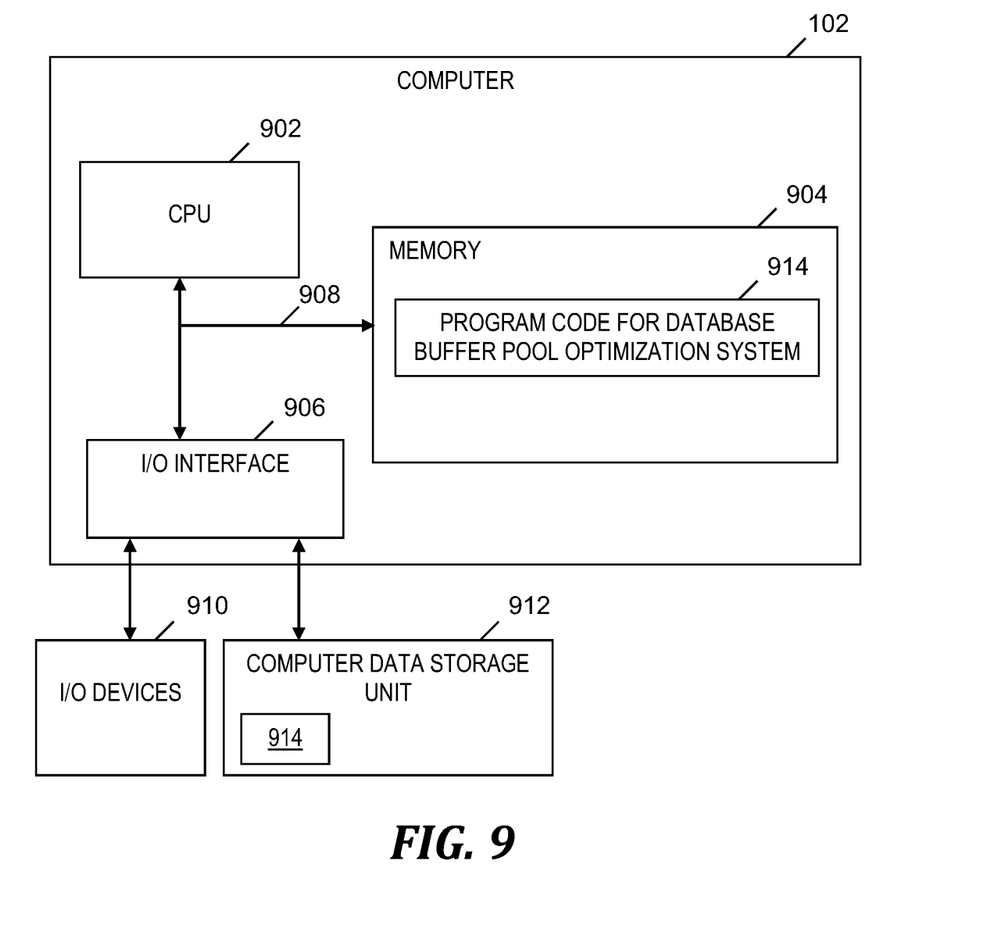
FIG. 9 is a block diagram of a computer that is included in the system of FIG. 1 and that implements the processes of FIG. 2, FIG. 3, FIG. 4, FIG. 5, and FIG. 6, in accordance with embodiments of the present invention.

FIG. 9 is a block diagram of a computer that is included in the system of FIG. 1 and that implements the processes of FIG. 2, FIG. 3, FIG. 4, FIG. 5, and FIG. 6, in accordance with embodiments of the present invention. Computer 102 is a computer system that generally includes a central processing unit (CPU) 902, a memory 904, an input/output (I/O) interface 906, and a bus 908. Further, computer 102 is coupled to I/O devices 910 and a computer data storage unit 912. CPU 902 performs computation and control functions of computer 102, including executing instructions included in program code 914 for database buffer pool optimization system 104 (see FIG. 1) to perform a method of optimizing a database buffer pool, where the instructions are executed by CPU 902 via memory 904. CPU 902 may include a single processing unit or processor or be distributed across one or more processing units or one or more processors in one or more locations (e.g., on a client and server).

Memory 904 includes a known computer readable storage medium, which is described below. In one embodiment, cache memory elements of memory 904 provide temporary storage of at least some program code (e.g., program code 914) in order to reduce the number of times code must be retrieved from bulk storage while instructions of the program code are executed. Moreover, similar to CPU 902, memory 904 may reside at a single physical location, including one or more types of data storage, or be distributed across a plurality of physical systems or a plurality of computer readable storage media in various forms. Further, memory 904 can include data distributed across, for example, a local area network (LAN) or a wide area network (WAN).

I/O interface 906 includes any system for exchanging information to or from an external source. I/O devices 910 include any known type of external device, including a display, keyboard, etc. Bus 908 provides a communication link between each of the components in computer 102, and may include any type of transmission link, including electrical, optical, wireless, etc.

I/O interface 906 also allows computer 102 to store information (e.g., data or program instructions such as program code 914) on and retrieve the information from computer data storage unit 912 or another computer data storage unit (not shown). Computer data storage unit 912 includes one or more known computer readable storage media, where a computer readable storage medium is described below. In one embodiment, computer data storage unit 912 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 904 and/or storage unit 912 may store computer program code 914 that includes instructions that are executed by CPU 902 via memory 904 to optimize a database buffer pool. Although FIG. 9 depicts memory 904 as including program code, the present invention contemplates embodiments in which memory 904 does not include all of code 914 simultaneously, but instead at one time includes only a portion of code 914.

Further, memory 904 may include an operating system (not shown) and may include other systems not shown in FIG. 9.

In one embodiment, computer data storage unit 912 includes a data repository (not shown in FIG. 1) and is operatively coupled to database buffer pool optimization system 104 (see FIG. 1). In one embodiment, buffer pool 116 (see FIG. 1) resides in computer data storage unit 912. In one embodiment, computer data storage unit 912 stores action list 108 (see FIG. 1), object control block 110 (see FIG. 1), write pending list 112 (see FIG. 1), and buffer pool manager vector table 114 (see FIG. 1). In one embodiment, computer data storage unit 912 stores a directory of hot read ranges.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing a database buffer pool. Thus, an embodiment of the present invention discloses a process for supporting computer infrastructure, where the process includes providing at least one support service for at least one of integrating, hosting, maintaining and deploying computer-readable code (e.g., program code 914) in a computer system (e.g., computer 102) including one or more processors (e.g., CPU 902), wherein the processor(s) carry out instructions contained in the code causing the computer system to optimize a database buffer pool. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing a database buffer pool.

While it is understood that program code 914 for optimizing a database buffer pool may be deployed by manually loading directly in client, server, and proxy computers (not shown) via loading a computer-readable storage medium (e.g., computer data storage unit 912), program code 914 may also be automatically or semi-automatically deployed into computer 102 by sending program code 914 to a central server or a group of central servers. Program code 914 is then downloaded into client computers (e.g., computer 102) that will execute program code 914. Alternatively, program code 914 is sent directly to the client computer via e-mail. Program code 914 is then either detached to a directory on the client computer or loaded into a directory on the client computer by a button on the e-mail that executes a program that detaches program code 914 into a directory. Another alternative is to send program code 914 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 914 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing a database buffer pool. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 904 and computer data storage unit 912) having computer readable program instructions 914 thereon for causing a processor (e.g., CPU 902) to carry out aspects of the present invention.

The computer readable storage medium can be a tangible device that can retain and store instructions (e.g., program code 914) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 914) described herein can be downloaded to respective computing/processing devices (e.g., computer 102) from a computer readable storage medium or to an external computer or external storage device (e.g., computer data storage unit 912) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 914) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, FIG. 4, FIG. 5, and FIG. 6) and/or block diagrams (e.g., FIG. 1 and FIG. 9) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 914).

These computer readable program instructions may be provided to a processor (e.g., CPU 902) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 912) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 914) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
   based on statistics about read operations and write operations in a range of pages, determining, by one or more processors, that the range of pages is a candidate for being a hot read range for which page locks and page latches are avoided in processing operations in the hot read range;
   creating, by the one or more processors and using an on-time trigger process or a pre-trigger process, the hot read range from the range of pages by marking a start point of the hot read range in the range of pages and an end point of the hot read range in the range of pages;
   determining, by the one or more processors, that one or more write operations are included in the hot read range by marking an object control block;
   based on the one or more write operations being included in the hot read range, adding, by the one or more processors, the one or more write operations to a write pending list;
   performing, by the one or more processors, the read operations in the hot read range without using a latch or a lock for any page in the hot read range;
   in response to the performing the read operations, merging, by the one or more processors, the one or more write operations from the write pending list to the range of the pages and performing the one or more write operations;
   determining, by the one or more processors, that a new read operation is arriving for processing and the write pending list includes a write operation from the one or more write operations;
   based on the new read operation arriving and the write pending list including the write operation, determining, by the one or more processors, that a conflict exists between the new read operation and the write operation; and
   in response to the determining that the conflict exists, processing, by the one or more processors, the write operation prior to processing the new read operation.

2. The method of claim 1, wherein the creating the hot read range includes:
   determining, using the on-time trigger process, a number of the read operations and a number of the write operations in the range of pages;
   determining, using the on-time trigger process, a ratio of the number of the read operations to the number of the write operations;
   determining, using the on-time trigger process, that the ratio exceeds a defined threshold amount; and
   adding, using the on-time trigger process and based on the ratio exceeding the defined threshold amount, the range of pages to a directory of hot read ranges.

3. The method of claim 1, further comprising:
   determining, by the one or more processors and using the pre-trigger process, that a current range of pages is a first hot read range;
   determining, by the one or more processors and using the pre-trigger process, that a ratio of a number of read operations in the current range of pages to a number of write operations in the current range of pages does not exceed a defined threshold amount;
   determining, by the one or more processors and using the pre-trigger process, that the current range of pages and previous hot read ranges are included in an ascending pattern or a descending pattern; and
   based on the current range of pages being the first hot read range, the ratio not exceeding the defined threshold amount, and the current range of pages being included in the ascending or descending pattern, marking, by the one or more processors and using the pre-trigger process, a subsequent range of pages as being a second hot read range.

4. The method of claim 1, further comprising:
   determining, by the one or more processors and using an on-time release process, a number of the read operations and a number of the write operations in the range of pages;
   determining, by the one or more processors and using the on-time release process, that a ratio of the number of the read operations to the number of the write operations does not exceed a defined threshold amount; and
   in response to the determining that the ratio does not exceed the defined threshold amount, removing, by the one or more processors and using the on-time release process, the range of the pages from a directory of hot read ranges, which releases the range of pages from being the hot read range.

5. The method of claim 1, further comprising:
   determining, by the one or more processors and using a pre-remove process, that ratios of read operations to write operations in prior ranges of pages are decreasing; and
   in response to the determining the ratios are decreasing, removing, by the one or more processors and using the pre-remove process, the range of the pages from a directory of hot read ranges, which releases the range of pages from being the hot read range.

6. The method of claim 1, further comprising:
   determining, by the one or more processors, that a first set of write operations in the write pending list had been included on a first page;
   based on the first set of write operations having been included on the first page, moving, by the one or more processors, the first set of write operations from the write pending list to a single page in a buffer pool or a contiguous group of pages in the buffer pool; and
   processing, by the one or more processors, the first set of write operations included in the single page in the buffer pool or in the contiguous group of pages in the buffer pool.

7. The method of claim 1, further comprising:
   adding, by the one or more processors, old read operations to old pages in a buffer pool and adding, by the one or more processors, a first write operation included in the one or more write operations to a first page in a buffer pool, the first write operation being in the write pending list, and the first page being subsequent to the old pages in the buffer pool;

reading, by the one or more processors and using the old read operations in the old pages and using the first page in the buffer pool, first data from a database;

in response to the reading using the old read operations in the old pages, placing, by the one or more processors, the first page in a free page list;

applying, by the one or more processors, the first write operation in the first page to write second data to the database;

in response to the applying the first write operation, creating, by the one or more processors, a mirror page in the buffer pool, the mirror page being a copy of the first page;

in response to the applying the first write operation, adding, by the one or more processors, new read operations to new pages in the buffer pool that are subsequent to the first page; and reading, by the one or more processors and using the new read operations in the new pages and using the mirror page in the buffer pool, third data in the database.

8. The method of claim 1, further comprising:

providing at least one support service for at least one of creating, integrating, hosting, maintaining, and deploying computer readable program code in the computer, the program code being executed by a processor of the computer to implement the determining that the range of the pages is the candidate for being the hot read range, the creating the hot read range from the range of pages, the determining that the one or more write operations are included in the hot read range, the adding the one or more write operations to the write pending list, the performing the read operations in the hot read range without using the latch or the lock, the merging the one or more write operations from the write pending list to the range of the pages and performing the one or more write operations, the determining that the new read operation is arriving for processing and the write pending list includes the write operation from the one or more write operations, the determining that the conflict exists, and the processing the write operation prior to processing the new read operation.

9. A computer program product for optimizing a database buffer pool, the computer program product comprising:

one or more computer readable storage media having computer readable program code collectively stored on the one or more computer readable storage media, the one or more computer readable storage media not being transitory signals per se, the computer readable program code being executed by a central processing unit (CPU) of a computer system to cause the computer system to perform a method comprising:

based on statistics about read operations and write operations in a range of pages, the computer system determining that the range of pages is a candidate for being a hot read range for which page locks and page latches are avoided in processing operations in the hot read range;

the computer system creating, using an on-time trigger process or a pre-trigger process, the hot read range from the range of pages by marking a start point of the hot read range in the range of pages and an end point of the hot read range in the range of pages;

the computer system determining that one or more write operations are included in the hot read range by marking an object control block;

based on the one or more write operations being included in the hot read range, the computer system adding the one or more write operations to a write pending list;

the computer system performing the read operations in the hot read range without using a latch or a lock for any page in the hot read range;

in response to the performing the read operations, the computer system merging the one or more write operations from the write pending list to the range of the pages and performing the one or more write operations;

the computer system determining that a new read operation is arriving for processing and the write pending list includes a write operation from the one or more write operations;

based on the new read operation arriving and the write pending list including the write operation, the computer system determining that a conflict exists between the new read operation and the write operation; and in response to the determining that the conflict exists, the computer system processing the write operation prior to processing the new read operation.

10. The computer program product of claim 9, wherein the creating the hot read range includes:

determining, using the on-time trigger process, a number of the read operations and a number of the write operations in the range of pages;

determining, using the on-time trigger process, a ratio of the number of the read operations to the number of the write operations;

determining, using the on-time trigger process, that the ratio exceeds a defined threshold amount; and adding, using the on-time trigger process and based on the ratio exceeding the defined threshold amount, the range of pages to a directory of hot read ranges.

11. The computer program product of claim 9, wherein the method further comprises:

the computer system determining, using the pre-trigger process, that a current range of pages is a first hot read range;

the computer system determining, using the pre-trigger process, that a ratio of a number of read operations in the current range of pages to a number of write operations in the current range of pages does not exceed a defined threshold amount;

the computer system determining, using the pre-trigger process, that the current range of pages and previous hot read ranges are included in an ascending pattern or a descending pattern; and based on the current range of pages being the first hot read range, the ratio not exceeding the defined threshold amount, and the current range of pages being included in the ascending or descending pattern, the computer system marking, using the pre-trigger process, a subsequent range of pages as being a second hot read range.

12. The computer program product of claim 9, wherein the method further comprises:

the computer system determining, using an on-time release process, a number of the read operations and a number of the write operations in the range of pages;

the computer system determining, using the on-time release process, that a ratio of the number of the read operations to the number of the write operations does not exceed a defined threshold amount; and in response to the determining that the ratio does not exceed the defined threshold amount, the computer system removing, using the on-time release process, the range of the pages from a directory of hot read ranges, which releases the range of pages from being the hot read range.

13. The computer program product of claim 9, wherein the method further comprises:

the computer system determining, using a pre-remove process, that ratios of read operations to write operations in prior ranges of pages are decreasing; and in response to the determining the ratios are decreasing, the computer system removing, using the pre-remove process, the range of the pages from a directory of hot read ranges, which releases the range of pages from being the hot read range.

14. A computer system comprising:

a central processing unit (CPU);

a memory coupled to the CPU; and one or more computer readable storage media coupled to the CPU, the one or more computer readable storage media not being transitory signals per se, the one or more computer readable storage media collectively containing instructions that are executed by the CPU via the memory to implement a method of optimizing a database buffer pool, the method comprising:

based on statistics about read operations and write operations in a range of pages, the computer system determining that the range of pages is a candidate for being a hot read range for which page locks and page latches are avoided in processing operations in the hot read range;

the computer system creating, using an on-time trigger process or a pre-trigger process, the hot read range from the range of pages by marking a start point of the hot read range in the range of pages and an end point of the hot read range in the range of pages;

the computer system determining that one or more write operations are included in the hot read range by marking an object control block;

based on the one or more write operations being included in the hot read range, the computer system adding the one or more write operations to a write pending list;

the computer system performing the read operations in the hot read range without using a latch or a lock for any page in the hot read range;

in response to the performing the read operations, the computer system merging the one or more write operations from the write pending list to the range of the pages and performing the one or more write operations;

the computer system determining that a new read operation is arriving for processing and the write pending list includes a write operation from the one or more write operations;

based on the new read operation arriving and the write pending list including the write operation, the computer system determining that a conflict exists between the new read operation and the write operation; and in response to the determining that the conflict exists, the computer system processing the write operation prior to processing the new read operation.

15. The computer system of claim 14, wherein the creating the hot read range includes:

determining, using the on-time trigger process, a number of the read operations and a number of the write operations in the range of pages;

determining, using the on-time trigger process, a ratio of the number of the read operations to the number of the write operations;

determining, using the on-time trigger process, that the ratio exceeds a defined threshold amount; and adding, using the on-time trigger process and based on the ratio exceeding the defined threshold amount, the range of pages to a directory of hot read ranges.

16. The computer system of claim 14, wherein the method further comprises:

the computer system determining, using the pre-trigger process, that a current range of pages is a first hot read range;

the computer system determining, using the pre-trigger process, that a ratio of a number of read operations in the current range of pages to a number of write operations in the current range of pages does not exceed a defined threshold amount;

the computer system determining, using the pre-trigger process, that the current range of pages and previous hot read ranges are included in an ascending pattern or a descending pattern; and based on the current range of pages being the first hot read range, the ratio not exceeding the defined threshold amount, and the current range of pages being included in the ascending or descending pattern, the computer system marking, using the pre-trigger process, a subsequent range of pages as being a second hot read range.

17. The computer system of claim 14, wherein the method further comprises:

the computer system determining, using an on-time release process, a number of the read operations and a number of the write operations in the range of pages;

the computer system determining, using the on-time release process, that a ratio of the number of the read operations to the number of the write operations does not exceed a defined threshold amount; and in response to the determining that the ratio does not exceed the defined threshold amount, the computer system removing, using the on-time release process, the range of the pages from a directory of hot read ranges, which releases the range of pages from being the hot read range.

18. The computer system of claim 14, wherein the method further comprises:

the computer system determining, using a pre-remove process, that ratios of read operations to write operations in prior ranges of pages are decreasing; and in response to the determining the ratios are decreasing, the computer system removing, using the pre-remove process, the range of the pages from a directory of hot read ranges, which releases the range of pages from being the hot read range.

* * * * *